United States Patent [19]
Kano et al.

[11] Patent Number: 5,895,851
[45] Date of Patent: Apr. 20, 1999

[54] SEMICONDUCTOR YAW RATE SENSOR WITH A VIBRATING MOVABLE SECTION WITH VERTICAL AND HORIZONTAL DISPLACEMENT DETECTION

[75] Inventors: Kazuhiko Kano, Obu; Yoshinori Otsuka; Tadashi Hattori, both of Okazaki, all of Japan

[73] Assignee: Nippondenso Co., Ltd., Kariya, Japan

[21] Appl. No.: 08/892,431

[22] Filed: Jul. 14, 1997

Related U.S. Application Data

[63] Continuation of application No. 08/551,747, Nov. 7, 1995, abandoned.

[30] Foreign Application Priority Data

Nov. 17, 1994 [JP] Japan .................................. 6-283282

[51] Int. Cl.$^6$ .......................................................... G01P 9/04
[52] U.S. Cl. ............................................. 73/504.04; 73/1.37
[58] Field of Search ............................. 73/504.02, 504.04, 73/504.12, 504.14, 514.15, 514.16, 514.35, 1.37, 1.82

[56] References Cited

U.S. PATENT DOCUMENTS 5,500,549  3/1996  Takeuchi et al. ...................... 73/514.36

FOREIGN PATENT DOCUMENTS

| 6-66569 | 3/1994 | Japan . |
| 6-123628 | 5/1994 | Japan . |
| 6-288773 | 10/1994 | Japan . |
| 7-159181 | 6/1995 | Japan . |

*Primary Examiner*—Christine K. Oda
*Attorney, Agent, or Firm*—Pillsbury Madison & Sutro LLP

[57] ABSTRACT

A yaw rate sensor, which can be structured easily and at low cost and which can also detect exerted acceleration with high accuracy, is obtained. A movable electrode section is provided spaced at a specified gap with respect to a semiconductor substrate; fixed electrodes for excitation use forcibly vibrate the movable electrode section using an electrostatic force; a vertical displacement detection portion detects a vertical displacement of the movable electrode section; a horizontal displacement detection portion detects a horizontal displacement of the movable electrode section; and using at least the detection output of the vertical displacement detection portion, a signal processing circuit obtains a yaw rate detection output. Then, an aging compensation circuit detects an amplitude condition of the movable electrode section using the output of the horizontal displacement detection means; and the forced vibration of the movable electrode section is maintained a vibration at a resonance frequency.

17 Claims, 8 Drawing Sheets

SEMICONDUCTOR YAW RATE SENSOR WITH A VIBRATING MOVABLE SECTION WITH VERTICAL AND HORIZONTAL DISPLACEMENT DETECTION

This is a continuation of application Ser. No. 08/551,747, filed on Nov. 7, 1995, which was abandonded upon the filing hereof.

BACKGROUND OF THE INVENTION

1. Field of the Invention

The present invention relates to a semiconductor yaw rate sensor of transistor type used, for example, in body control and navigation of a vehicle, and to a method of producing same.

2. Related Arts

Japanese Patent Application Laid-open No. 2-223817 discloses a yaw rate sensor which detects yaw rate acting upon a vehicle body. This yaw rate sensor is structured with a vibrator wherein a piezoelectric element is glued to a specified surface of a square rod made of metal, and is structured such that the vibrator is supported by means of a fine rod. Additionally, an angular-velocity sensor disclosed in Japanese Patent Application Laid-open No. 4-142420 is structured with a piezoelectric element glued to a tuning fork made of metal. In either case these devices to detect the acceleration of yaw rate subject the main unit to vibration with a piezoelectric element, and attempt to detect, by means of changes in voltage detected by another piezoelectric element, distortion generated by Coriolis force generated by means of the yaw rate which is the measurement object.

Performance such as detection sensitivity in a sensor mechanism structured in this manner comes to be influenced by the method of support and machining precision of the vibrator, and consequently, in order to produce a high-performance sensor mechanism, there exist the problems of a high degree of difficulty in the machining and assembly thereof, and of necessarily high cost. Additionally, with respect also to achieving smaller size of the sensor mechanism, difficulty is encountered because of limitations in machining and assembly.

SUMMARY OF THE INVENTION

In order to solve these kinds of problems, the inventors of the present invention considered producing a compact, inexpensive semiconductor yaw rate sensor by utilizing a transistor-type displacement detection mechanism and applying semiconductor technology. This semiconductor yaw rate sensor comprises: a semiconductor substrate; a bridge structure movable electrode for gate use movably suspended by the semiconductor substrate; a fixed electrode for excitation use positioned above the semiconductor substrate which, by being subjected to an electrical signal of a specified frequency and utilizing electrostatic force, causes said movable electrode to vibrate in a horizontal direction with respect to the semiconductor substrate; and source and drain electrodes formed on the semiconductor substrate by means of an impurity diffusion layer, and detects a yaw rate from a current variation between the source and drain electrodes generated by the displacement of the moveable electrode in a vertical direction with respect to the semiconductor substrate attendant to a yaw rate effect.

However, in this kind of semiconductor yaw rate sensor, attentions to the actual vibration conditions of the movable electrode excited by the fixed electrode for excitation use, such as an amplitude and a forced vibration frequency, are not directed. Therefore, in case there is aging in the characteristics of the components constituting the bridge structure, the resonance frequency of the bridge structure changes, and a phase shift between the actual vibration of the bridge structure and the electrical signal for exciting use occurs, and thereby the vibrator amplitude (vibration speed) changes. This invites a novel problem that the high accuracy angular velocity detection is not expected.

That is, in a case where the movable section is forcibly vibrated; due to factors such as the viscosity of the air and resistance in proportion to the vibration speed, there are cases where the actual vibration of the movable section and the excitation frequency are different in phases thereof. Furthermore, in case there is aging in the components for forming the structure (aging of the spring coefficient etc.), and accordingly the resonance frequency changes. Because of this change in the resonance frequency, if the excitation frequency is fixed, the amplitude in a horizontal direction of the movable section becomes smaller, the Coriolis force proportional to the vibration speed becomes smaller, and displacement in a vertical direction becomes smaller. Because of this, it is not possible to carry out accurate detection of yaw rate.

In light of the above-described problems, it is an object of the present invention to provide a yaw rate sensor which can be structured easily and at low cost, and which can of course also detect an exerted yaw rate with high accuracy.

The semiconductor yaw rate sensor according to the present invention includes: a semiconductor substrate; a bridge structure movable section movably supported on the semiconductor substrate such that a specified interval is interposed between the movable section and the semiconductor substrate; a fixed electrode for excitation use disposed on the semiconductor substrate in order to forcibly vibrate the movable section in a horizontal direction utilizing electrostatic force; a vertical displacement detection means for detecting a vertical displacement of the movable section; a horizontal displacement detection means for detecting a horizontal displacement of the movable section; a signal processing means obtaining a yaw rate detection output utilizing at least a detection output of the vertical displacement detection means; and a correction means for keeping, based on an output of the horizontal displacement detection means, the movable section forcibly vibrated in the horizontal direction at a resonance frequency.

When an applied yaw rate is intended to be detected, a cyclic voltage is applied between the fixed electrode for excitation use and the movable section, and thereby the movable section is vibrated in a horizontal direction with respect to the semiconductor substrate. In this condition, when the yaw rate to be detected is applied, the movable section displaces in a vertical direction with respect to the substrate due to Coriolis force, and this vertical displacement is detected by the vertical displacement detection means. Herein, if this vertical displacement detection means comprises a transistor construction, the vertical displacement is discovered as a change in the drain current of the transistor construction, and therefore the applied yaw rate is detected by monitoring the change in the drain current.

Herein, in case the movable section is forcibly vibrated, due to factors such as the viscosity of the air and resistance in proportion to the vibration speed, there are cases where the phase difference appears between the excitation frequency of the applied cyclic voltage and the resultant vibration of the moveable section. Furthermore, if the raw materials constituting the movable section deteriorates with age (e.g. aging of the spring coefficient etc.), and consequently the resonance frequency changes. Therefore, if the excitation frequency is fixed, the change in the resonance frequency invites a smaller amplitude in a horizontal direction of the movable section, and accordingly the Coriolis force proportional to the vibration speed becomes smaller, and the displacement of the movable section in a vertical direction becomes smaller.

As a countermeasure to this, according to the present invention, the movable section is made to be always vibrated at the resonance frequency thereof even if there is aging of the spring coefficient. Namely, according to the present invention, the horizontal vibration conditions of the movable section (frequency, amplitude and so on) are detected by providing a horizontal displacement detection means, and the movable section is controlled to be vibrated in the horizontal direction at the resonance frequency by using the detected horizontal vibration conditions, and therefore it is possible to detect the applied yaw rate with high accuracy. As the horizontal displacement detection means, the following semiconductor devices may be applicable:

A transistor type detector, which comprises a source and drain electrodes made of an impurity diffusion layer provided on the semiconductor substrate and a movable gate electrode provided using the movable section to form an air gap transistor together with the source and drain electrodes, thereby detecting the horizontal vibration state of the movable section as a current change between the source and drain electrodes due to the changes in gate length or gate width of the air gap transistor; and A capacitor type detector, which comprises a fixed electrode provided on the semiconductor substrate and a movable electrode provided using the movable section to form a variable capacitor the capacitance of which varies in accordance with the horizontal displacement of the movable section, thereby detecting the horizontal vibration state of the movable section as a change in the capacitance of the variable capacitor.

By providing the horizontal displacement detection means, the vibration condition of the movable section can be detected, and highly accurate yaw rate detection is made possible.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY
PREFERRED EXEMPLARY EMBODIMENTS

Several embodiments according to the present invention will be described hereinafter with reference to the drawings.

First Embodiment

Figure 1:
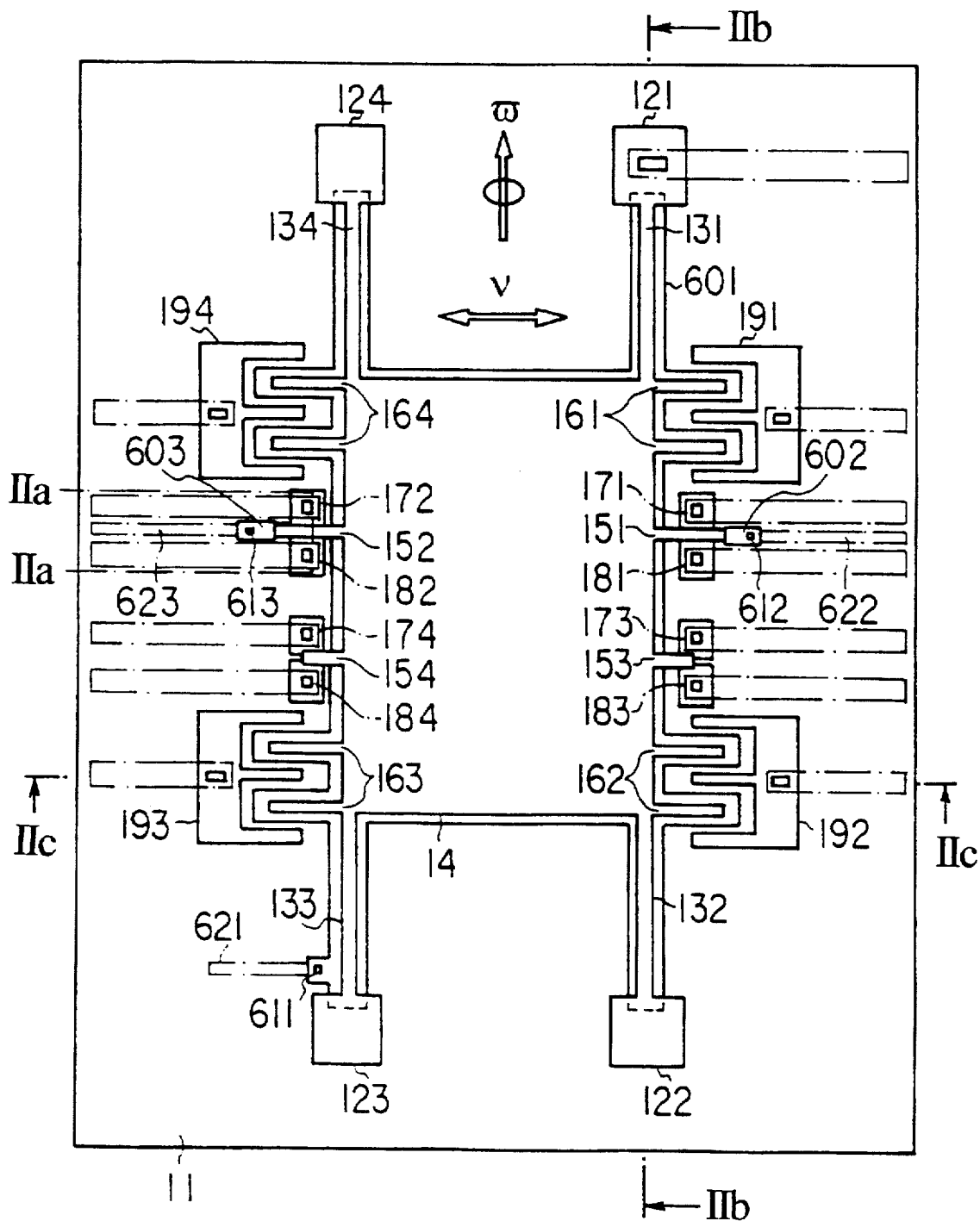
FIG. 1 is a schematic plan view showing a semiconductor yaw rate sensor according to a first embodiment of the present invention.

FIG. 1 indicates a planar structure of a yaw rate sensor according to the first embodiment. A semiconductor substrate 11 is composed of a p-type silicon substrate. On the semiconductor substrate 11, four anchor portions 121 to 124 are provided, and a suspended microstructure, i.e., a weight 14 supported by beams 131 to 134, is provided so as to be suspended at the four anchor portions 121 to 124.

On the weight 14 are integrally formed movable gate electrodes 151, 152, 153 and 154 of cantilever configuration structuring gate electrodes of transistors. The movable gate electrodes 151, 152, 153 and 154 protrude laterally from, for example, an opposing pair of side portions of the weight 14. The weight 14 functions as the mass portion of the movable gate electrodes 151 to 154 for providing, for example, sensitivity to Coriolis force perpendicular to the weight 14. Here, the movable gate electrodes 151 and 152 are provided in order to detect the amount of displacement in a vertical direction due to an applied yaw rate, and the movable gate electrodes 153 and 154 are provided in order to detect the amount of displacement in a horizontal direction due to the forcibly vibration for detecting the applied yaw rate. Hereinafter, the movable gate electrodes 151 and 152 are referred to as movable gate electrodes for vertical displacement detection, and the movable gate electrodes 153 and 154 are referred to as movable gate electrodes for horizontal displacement detection.

Moreover, on the weight 14, excitation electrodes 161 and 164 are integrally formed so as to be positioned on each outer side of the movable gate electrodes for vertical displacement detection 151 and 152 (beam 131 and 134 side), and excitation electrodes 162 and 163 are integrally formed so as to be positioned on each outer side of the movable gate electrodes for horizontal displacement detection 153 and 154 (beam 132 and 133 side). The excitation electrodes 161 to 164 protrude laterally from the side portion of the weight 14 parallel to the movable gate electrode 151 to 154 and have a pectinate configuration. The excitation electrodes 161 to 164 act to impart a horizontal vibration to the weight 14 and the movable gate electrodes 151 to 154 according to an application of the electrostatic force thereto.

The anchor portions 121 to 124, beams 131 to 134, weight 14, movable gate electrodes 151 to 154, and also excitation electrodes 161 to 164, all of which form a movable section of the suspended microstructure, are structured integrally of a heat-resistant metal such as polycrystalline silicon, tungsten etc. In the present embodiment, polycrystalline silicon is used as a representative material. Furthermore, the weight 14 and the movable gate electrodes 151 to 154 and excitation electrodes 161 to 164 structured integrally with one another are disposed on a main surface of the semiconductor substrate 11 with a specified interval interposed therebetween, and are movably supported by the anchor portions 121 to 124 via the beams 131 to 134.

On the main surface of the semiconductor substrate 11 composed of p-type silicon are formed four pairs of source/ drain electrodes 171/181, 172/182, 173/183 and 174/184 so as to correspomd to the cantilever-shaped movable gate electrodes 151, 152, 153 and 154, respectively. Each pair of source/drain electrodes is of a diffusion layer formed by means of introducing n-type impurities by such means as ion implantation or the like. According to this, four air gap transistors using the movable gate electrodes 151 to 154 as respective gate electrodes is formed.

In these four air gap transistors, the amount of overlap between the movable gate electrodes for vertical displacement detection 151 and 152 and the corresponding source/drain electrodes and the amount of overlap between the movable gate electrodes for horizontal displacement detection 153 and 154 and the corresponding source/drain electrodes are different from each other.

That is to say, the movable gate electrodes 151 and 152 of the air gap transistors in a vertical direction detection portion protrude laterally from the side portions of the weight 14 so as to completely overlap with the corresponding source/drain electrodes 171/181 and 172/182 even when the weight 14 is vibrated in a horizontal direction. According to this arrangement, though the drain current thereof does not change during the vibration in the horizontal direction, when the weight 14 receives Coriolis force and displaces in a vertical direction, an air gap between the semiconductor substrate 11 and the movable gate electrode changes, the drain current thereof changes and the vertical displacement of the movable gate electrode can be detected.

On the other hand, within a horizontal displacement detection portion, although the movable gate electrodes 153 and 154 of the air gap transistors protrude laterally from the side portions of the weight 14, the overlap amount between the movable gate electrode 153 (154) and the corresponding source/drain electrodes 173/183 (174/184) is made shorter than the opposing length between the source electrode 173 (174) and the drain electrode 183 (184). That is to say, when the weight 14 is vibrated in the horizontal direction, the overlap amount changes, the gate width in transistor terms changes in accordance with the horizontal vibration of the weight 14, the drain current of the air gap transistor in the horizontal displacement detection portion is modulated and the displacement in the horizontal direction can be detected.

On the semiconductor substrate 11 are provided fixed electrodes for excitation use 191 to 194 so as to be disposed corresponding to the excitation electrodes 161 to 164, respectively. The fixed electrodes for excitation use 191 to 194 are each established fixedly at a height identical to the excitation electrodes 161 to 164 on the main surface of the semiconductor substrate 11, and have a pectinate configuration which engages with the corresponding pectinate excitation electrode 161 to 164. Between the engaged pectinate electrodes 161/191, 162/192, 163/193 and 164/194, specified gaps are provided.

The respective fixed electrodes for excitation use 191 to 194 are each connected via an aluminum lead to a power supply (not illustrated) are supplied with a voltage signal of a specified frequency, cause the excitation electrodes 161 to 164 to vibrate by means of electrostatic force, and thereby cause the weight 14 and movable electrodes 151 to 154 to vibrate in the horizontal direction with respect to the semiconductor substrate 11. Furthermore, the weight 14 provided integrally with the movable gate electrodes 151 to 154 and excitation electrodes 161 to 164 is connected to an external circuit (not illustrated) via the beam 131, anchor portion 121 and an aluminum lead, and moreover the source electrodes 171, 172, 173 and 174 and drain electrodes 181, 182, 183 and 184 are also connected via aluminum leads to an external current detector circuit (not illustrated).

In correspondence with the beams 131 to 134, weight 14, excitation electrodes 161 to 164 and the movable gate electrodes for vertical displacement detection 151 and 152, on the surface of the semiconductor substrate 11 are formed underlying electrodes 601, 602 and 603 by an ion-implantation or the like. The underlying electrodes 601 to 603 are isolated from the source/drain electrodes and are connected to aluminum leads 621, 622 and 623 respectively via contact holes 611, 612 and 613. By applying an electric potential equal to the weight 14, which is integrally provided with beams, excitation electrodes and the movable gate electrodes, the area which generates an attractive electrostatic force between the substrate and the movable section is restricted within a small area under the movable gate electrode, i.e., inversion layer forming area in each of the air gap transistors, and therefore it is possible to prevent the movable section from being attracted to contact the substrate 11 by a great electrostatic force.

That is to say, when an inversion layer is formed between the source electrode and the drain electrode and the current flows therethrough, an electrical potential difference occurs between the semiconductor substrate and the movable section, and inevitably an attractive electrostatic force is generated therebetween. The generated electrostatic force is an extremely strong force, and the movable section composed of the movable gate electrodes, weight, excitation electrodes and the beams are entirely pulled towards the semiconductor substrate 11. To prevent the movable section from contacting the substrate, it is considered that the beams are made to be strengthened; namely, the spring coefficient of the beams are made larger. However, this makes the amount of displacement of the movable section, i.e., the amount of displacement of the movable gate electrodes for vertical displacement detection, in the vertical direction smaller when Coriolis force is received, and thereby makes it difficult to detect the acting Coriolis force, or the applied yaw rate. Therefore, in order to reduce the influence of the attractive electrostatic force, according to the present embodiment, the underlying electrodes 601 to 603 are provided to make the area of generating electrostatic force smaller.

Figure 2A:
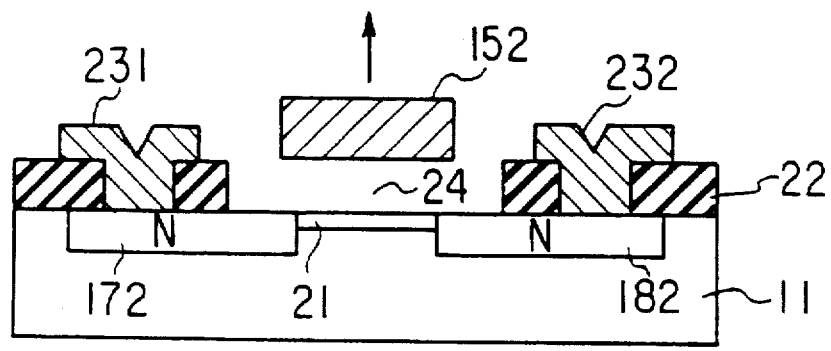
FIGS. 2A, 2B, and 2C are schematic sectional views taken along lines IIa—IIa, IIb—IIb, and IIc—IIc of FIG. 1, respectively.

FIG. 2A shows a sectional structure of a portion corresponding to line IIa—IIa of FIG. 1. The semiconductor substrate 11 of p-type silicon is provided with the source electrode 172 and drain electrode 182 formed of an n-type diffusion layer at the main surface thereof. An inversion layer 21 is formed between the source electrode 172 and drain electrode 182 when a threshold voltage is applied to the movable gate electrode for vertical displacement detection 152. An insulation film 22 is formed on the semiconductor substrate 11, and aluminum leads 231 and 232 are connected respectively to the source electrode 172 and drain electrode 182. Between the movable gate electrode 152 and semiconductor substrate 11 is established an air gap 24 corresponding to the thickness of the insulation film 22, and the movable gate electrode 152 is caused to be displaceable perpendicularly to the semiconductor substrate 11 as well as parallel to the semiconductor substrate 11.

Figure 2B:
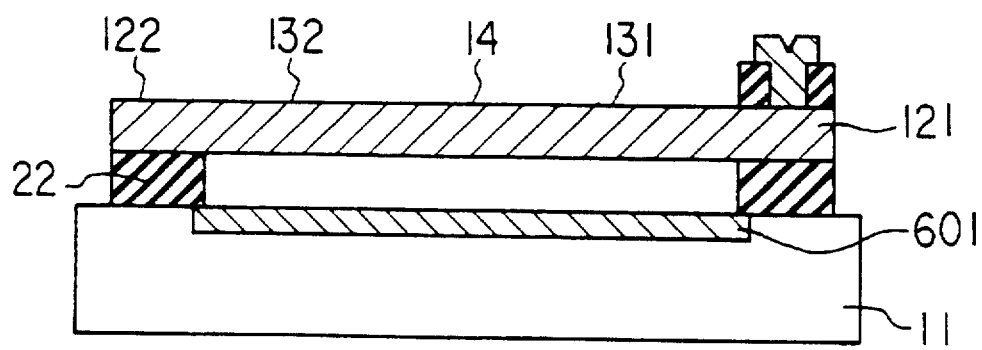

FIG. 2B shows a sectional structure of a portion corresponding to line IIb—IIb of FIG. 1. The weight 14 structured of, for example, polycrystalline silicon is established so as to be supported by the insulation film 22 formed on the semiconductor substrate 11. The weight 14 is supported between the anchor portions 121 and 122 via the beams 131 and 132. Herein, the insulation film 22 is for establishing the air gap 24, and is composed of silicon dioxide, silicon nitride, or the like. Furthermore, the underlying electrode 601 is formed at the surface of the substrate 11 so as to face onto the weight 14 and beams 131 and 132. The underlying electrode 601 may be formed utilizing an electroconductive thin film.

Figure 2C:
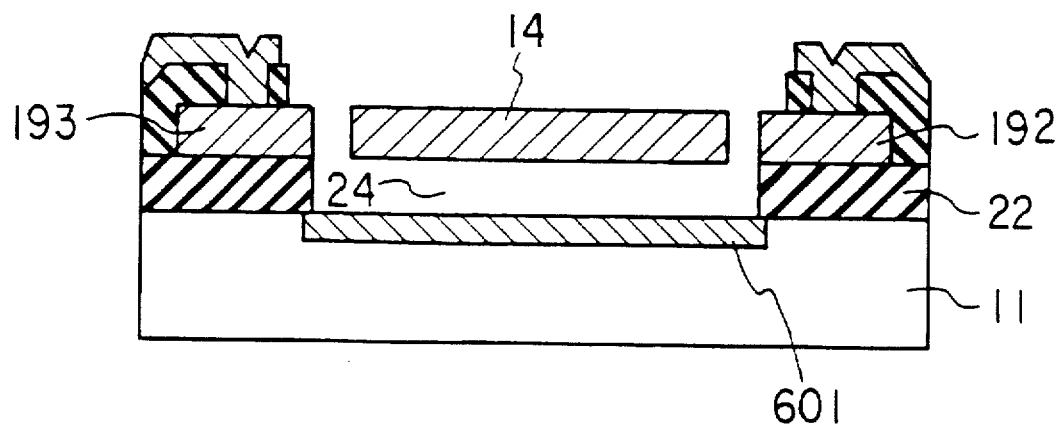

The insulation film 22 is used as a sacrificial layer to defines the interval (air gap) 24 between the weight 14 (the movable gate electrodes 151 to 154) and semiconductor substrate 11 by the thickness thereof. A portion where the insulation film 22 is used as the sacrificial layer is determined at a position under the movable section except for the portions corresponding to the anchor portions 121 to 124. At the time of etching of the isolation film 22, i.e., a sacrificial layer etching, an etchant which etches only the insulation film 22 without etching the substrate 11 and the movable section of polycrystalline silicon is used. FIG. 2C shows a sectional structure of a portion corresponding to line IIc—IIc of FIG. 1, and the gap 24 is established between the weight 14 and the surface of the semiconductor substrate 11.

Next, a method of production of the semiconductor yaw rate sensor structured in this manner will be described with reference to FIGS. 3A to 3I. A state representing the portion shown in FIG. 2A is indicated in these drawings. Additionally, a MOSFET device as a sensor processor circuit is hypothesized on the right-hand of the drawings, and the production process thereof is indicated as well.

Figure 3A:
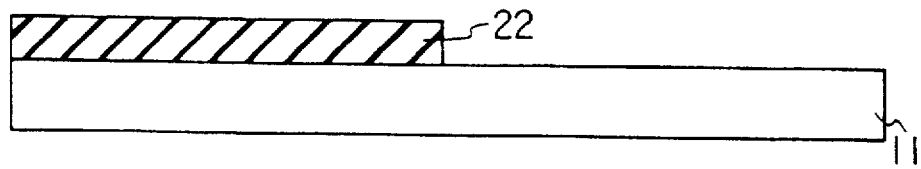
FIGS. 3A through 3I are sectional views sequentially describing a method of production of the semiconductor yaw rate sensor.
Figure 3B:
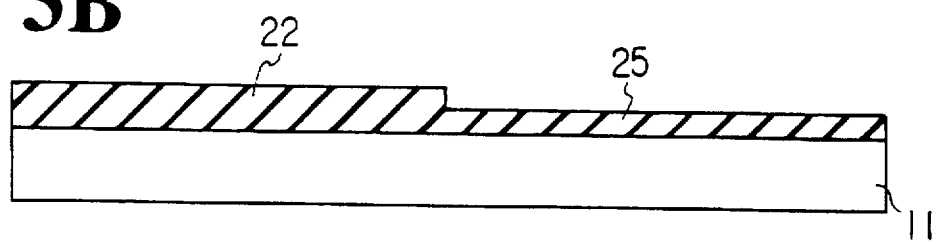

First, as shown in FIG. 3A, a insulation film 22, which is used as a sacrificial layer, is formed on a semiconductor substrate 11 of p-type silicon so as to be located at a surface corresponding to a sensor production portion. The insulation film 22 can be provided by forming the entire main surface of the semiconductor substrate 11 and then removing insulation film on a transistor production portion. Then, as shown in FIG. 3B, a gate insulation film 25 is formed by means of gate oxidation on the main surface of the semiconductor substrate 11 corresponding to the transistor production portion.

Figure 3C:
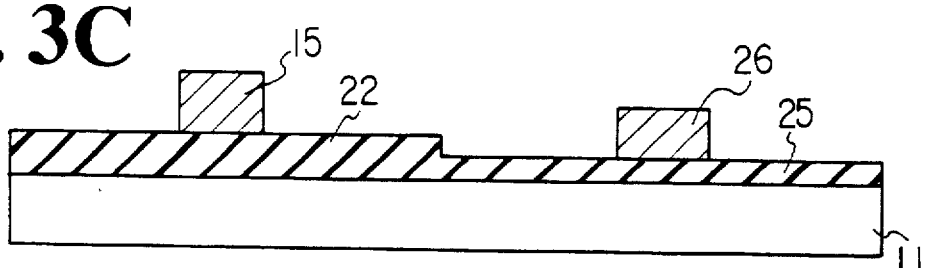
Figure 3D:
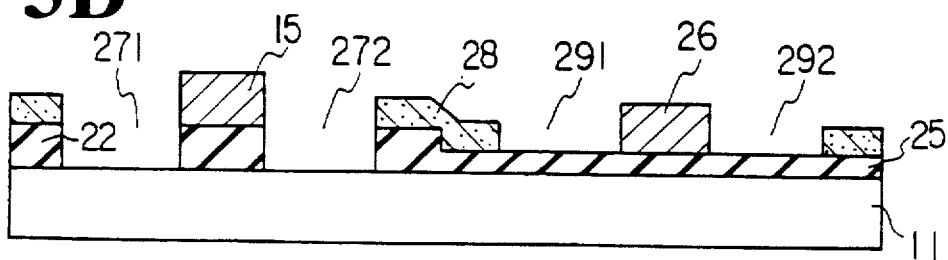

Next, as shown in FIG. 3C, a polycrystalline silicon film is deposited on the insulation films 22 and 25, and is patterned into a movable gate electrode 15 as well as a transistor gate electrode 26 by a photolithographic process. Simultaneously, the anchor portions 121 to 124, beams 131 to 134, the weight 14 and the like, all of which form the movable section in FIG. 1, are formed by patterning the deposited polycrystalline silicon film. Then, as shown in FIG. 3D, a photoresist 28 is formed by means of a photolithographic process, and on insulation film 22 are formed openings 271 and 272 in a self-alignment with the movable gate electrode 15.

Figure 3E:
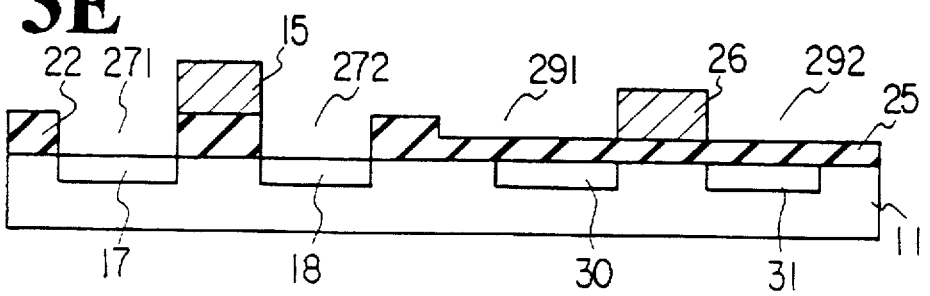

Additionally, openings 291 and 292 are self-alignedly formed on the photoresist 28 in the transistor production portion. Next, as shown in FIG. 3E, n-type impurities are ion-implanted into the semiconductor substrate 11 using the photoresist 28 and the gate electrodes 15 and 26 as an ion-implantation mask. After peeling off the photoresist 28, a source electrode 17 and drain electrode 18 of an n-type diffusion layer are formed in the sensor production portion so as to correspond to the movable gate electrode 15, and moreover a source electrode 30 and drain electrode 31 are formed in the transistor production portion so as to correspond to the transistor gate electrode 26.

Figure 3F:
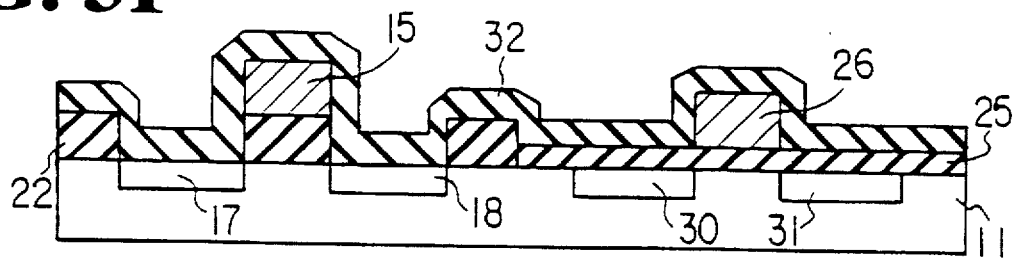
Figure 3G:
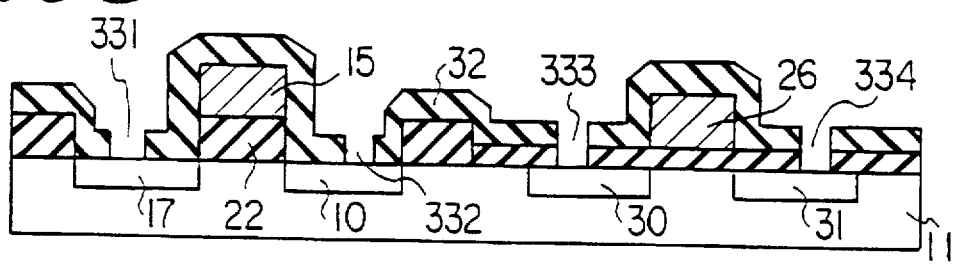
Figure 3H:
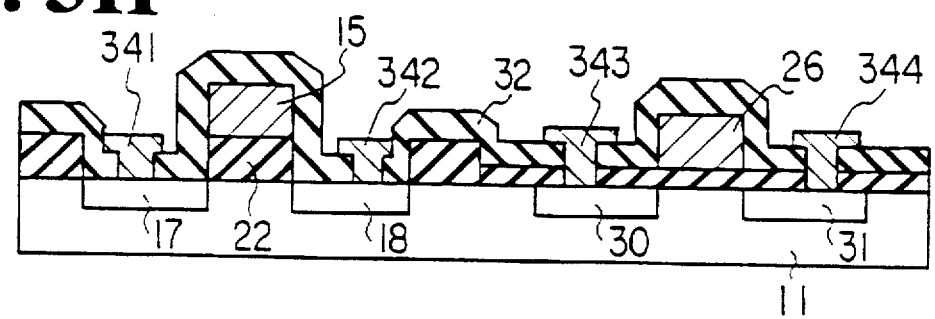

Next, as shown in FIG. 3F, a layer insulation film 32 is formed over the entire surface in order to electrically insulate the movable gate electrode 15 and transistor gate electrode 26 from an upper aluminum leads. Then, as shown in FIG. 3G, in correspondence with the source/drain electrodes 17/18 as well as the source/drain electrodes 30/31, contact holes 331 to 334 are formed with respect to the layer insulation film 32. As shown in FIG. 3H, an aluminum film is deposited over the entire surface and is patterned to form a respective aluminum leads 341 to 344, which contact the source/drain electrodes 17/18 and the source/drain electrodes 30/31 through the contact holes 331 to 334, respectively.

Figure 3I:
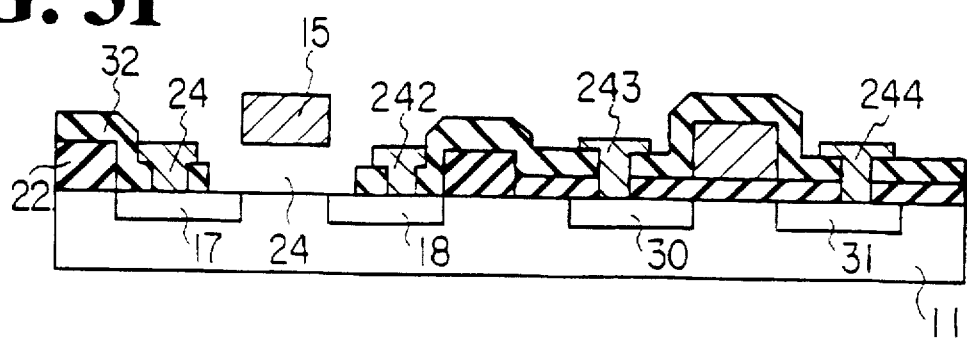

Next, as shown in FIG. 3I, the insulation film 22 beneath the movable gate electrode 15 is taken to be a sacrificial layer and etched so that an air gap 24 is formed beneath the movable electrode 15, and thereby the semiconductor yaw rate sensor shown in FIGS. 1, 2A, 2B and 2C is completed.

Generally, in a case where a single-point load is applied to a cantilever or a doubly-supported structure, the resultant displacement thereof is inversely proportional to the beam's thickness to the third power and width to the first power. For this reason, extreme precision is demanded in the machining of the thickness of the beam in comparison with the machining of the width thereof. In the semiconductor yaw rate sensor according to the embodiment, a thin film formed on the silicon substrate 11, for example, polycrystalline silicon doped with impurities at a high concentration or a material such as a heat-resistant metal, is used as the material structuring the beams 131 to 134. Therefore, it becomes possible to adequately reduce fluctuations in the thickness of the beams 131 to 134.

Additionally, the carrier concentration of the transistor inversion layer is inversely proportional to the distance between the substrate 11 and the gate electrode (movable electrode), and also current flowing through the inversion layer is similarly inversely proportional to this distance. According to the present embodiment, in order to provide the movable gate electrodes 151 to 154 which is suspended via the beams 131 to 134 to be made movable with respect to the semiconductor substrate 11, a sacrificial layer, which means a thin film priorly formed with the object of ultimate removal, is formed priorly to a formation of a polycrystalline layer of beam configuration, and then the sacrificial layer is removed. Therefore, specified intervals between the semiconductor substrate 11 and the movable gate electrodes 151 to 154 are defined by the thickness of the sacrificial layer. In other words, according to the embodiment the distances between the movable gate electrodes 151, 152, 153 and 154, which function as gates of the air gap transistors, and the semiconductor substrate 11 can be controlled by means of the thickness of the sacrificial layer, and because the controllability of the film thickness of the sacrificial layer is good, the controllability of the current values between the source electrodes and the drain electrodes is also markedly improved.

Moreover, the semiconductor yaw rate sensor of the embodiment has source and drain electrodes disposed on the semiconductor substrate 11 so as to correspond to the respective movable gate electrodes 151, 152, 153 and 154 to thereby form the air gap transistors. In the vertical displacement detection portion, the drain current flowing through the formed air gap transistor of the movable gate electrode 151 (152). On the other hand, in the horizontal displacement detection portion, the drain current flowing through the formed air gap transistor changes in accordance with a horizontal displacement of the movable gate electrode 153 (154). In other words, vertical displacement of the weight 14 of the movable section is detected from current changes, which varies due to the vertical displacement of the movable gate electrode 151 (152), of the air gap transistors in the vertical displacement detection portion.

Generally, drain current is caused to change by changing a gate voltage in a normal transistor. In the air gap transistor of the embodiment, however, the movable gate electrode is caused to displace with respect to the semiconductor substrate to thereby vary the carrier concentration in the inversion layer, and the drain current thereof is caused to change. The embodiment utilizes this effect in the detection mechanism of the yaw rate. That is to say, when a yaw rate to be detected is applied to the weight 14, the weight 14 is vertically displaced by the generated Coriolis force. By detecting the current changes of the air gap transistor in the vertical displacement detection portion, the displacement of the weight 14 is detected and the applied yaw rate is measured.

Here, when the movable electrodes for vertical displacement detection 151 and 152 are displaced in the direction of the substrate 11, the threshold voltage becomes smaller due to the increase in capacitance, and the drain current increases. Furthermore, because the field strength between the gate electrode and substrate becomes larger, the drain current increases. Consequently, a change, which is greater than the rate of displacement of the movable gate electrodes 151 and 152, in drain current occurs.

On the other hand, horizontal displacement of the weight 14 of the movable section is detected from current changes, which varies due to the horizontal displacement of the movable gate electrode 153 (154), of the air gap transistors in the horizontal displacement detection portion. That is, when the weight 14 is excited in a horizontal direction, the movable gate electrodes for horizontal displacement detection 153 and 154 displace in a horizontal direction with respect to the semiconductor substrate 11, and each amount of the overlaps between source/drain electrodes 173/183, 174/184 and movable gate electrodes 153, 154 changes and a change occurs in each drain current.

Moreover, in fabricating the yaw rate sensor, diffusion layers forming the respective source/drain electrodes 171/181 and 172/182 are formed and disposed so as to be in self-alignment with the respective movable gate electrodes 151 and 152. That is to say, after forming a sacrificial layer on the semiconductor substrate and forming and machining the configuration of the movable gate electrodes 151 and 152, windows are opened in formation regions of source and drain electrodes, and thereafter impurities are introduced by ion-implantation method into the semiconductor substrate 11 through the windows to form the diffusion layers forming the source electrodes 171 and 172 as well as the drain electrodes 181 and 182.

Consequently, it becomes possible always to form the movable gate electrodes 151 and 152 reliably in the central portion between the source electrodes 171 and 172 and drain electrodes 181 and 182, and position-alignment tasks in the fabrication process can be simplified. Additionally, for these methods of production are all applicable IC fabrication processes, which can integrate the sensor fabrication processes with the IC fabrication processes and also make it easily possible to integrate other circuit elements.

In the yaw rate sensor according to the embodiment, a movable section is structured by a doubly-supported structure, but this can, of course, also be achieved with cantilever structure, and moreover there is no particular need for the number of beams to be four. Additionally, transistors as well as excitation electrodes are provided on both sides in the direction of vibration, but it is of course acceptable for this to be one side. In addition, the number of comb teeth of the pectinate electrodes for excitation use is indicated as three on the fixed electrode side and two on the movable electrode side, but a structure combining greater numbers is also acceptable. Furthermore, although employment of a p-type semiconductor as the substrate is disclosed, but a structure utilized an n-type substrate is also acceptable, and in this n-type case the diffusion electrodes are formed as p-type diffusion layers. Moreover, there is no need for the weight 14 to be square; a structure with, for example, a triangular configuration is also possible.

Next, the operation of the semiconductor yaw rate sensor will be described.

Now, when voltage is applied between the movable gate electrodes 151, 152, 153 and 154 and the semiconductor substrate 11, inversion layers 21 are formed between the source electrodes 171, 172, 173 and 174 and the drain electrodes 181, 182, 183 and 184 respectively, and currents flow. When excitation voltage of a certain frequency is applied to the fixed electrodes for excitation use 191 to 194, electrostatic force is generated between the fixed electrodes for excitation use 191 to 194 and the excitation electrodes 161 to 164 and acts upon the excitation electrodes 161 to 164 so that the horizontal vibration indicated by v in FIG. 1 is generated in the movable section. Accordingly, the movable gate electrodes 151 to 154 are also vibrated together with the weight 14. When a yaw rate ω, which is horizontal with the semiconductor substrate 11 and also has an axis perpendicular to the vibration v, is applied to the weight 14, Coriolis force, which is proportional to the speed of this vibration and mass of the vibrating member, is generated perpendicular to the surface of the weight 14 by the applied yaw rate ω and acts upon the weight 14. Accordingly, the movable gate electrodes 151, 152, 153 and 154 protruded from the side portions of the weight 14 are displaced perpendicularly to the substrate 11. By the vertical displacement of the movable gate electrodes 151, 152, 153 and 154 with respect to the substrate 11, the electrical field strength between the movable gate electrodes and substrate changes and the currents between the respective source electrodes 171 and 172 and drain electrodes 181 and 182 change. Thereby, the applied yaw rate can be detected by means of this drain current value.

As described above, the Coriolis force acting upon the movable section is proportional to the product of the mass of the movable section, vibration speed, and the applied yaw rate. Therefore, to detect the applied yaw rate based on the vertical displacement of the movable section with high accuracy, it is necessary to increase the vibration speed, and therefore it is preferable to vibrate the movable section, i.e., weight 14, at the resonance frequency where vibration amplitude becomes large. Herein, although the mass of the movable section does not change, there is a case where the vibration speed varies. Furthermore, there is a case where the forced vibration of the movable section is shifted from the excitation signal applied to the fixed electrodes for excitation use in phases thereof and thereby it becomes difficult to vibrate the movable section at the resonance frequency. Therefore, it is necessary that the vibration state, such as vibration speed, of the movable section is correctly detected.

Thus, the semiconductor yaw rate sensor according to this embodiment is provided with a transistor-type horizontal displacement detection means in order to detect the horizontal vibration condition of the movable section, and makes it possible to detect the accurate yaw rate utilizing the detection output therefrom.

Figure 4:
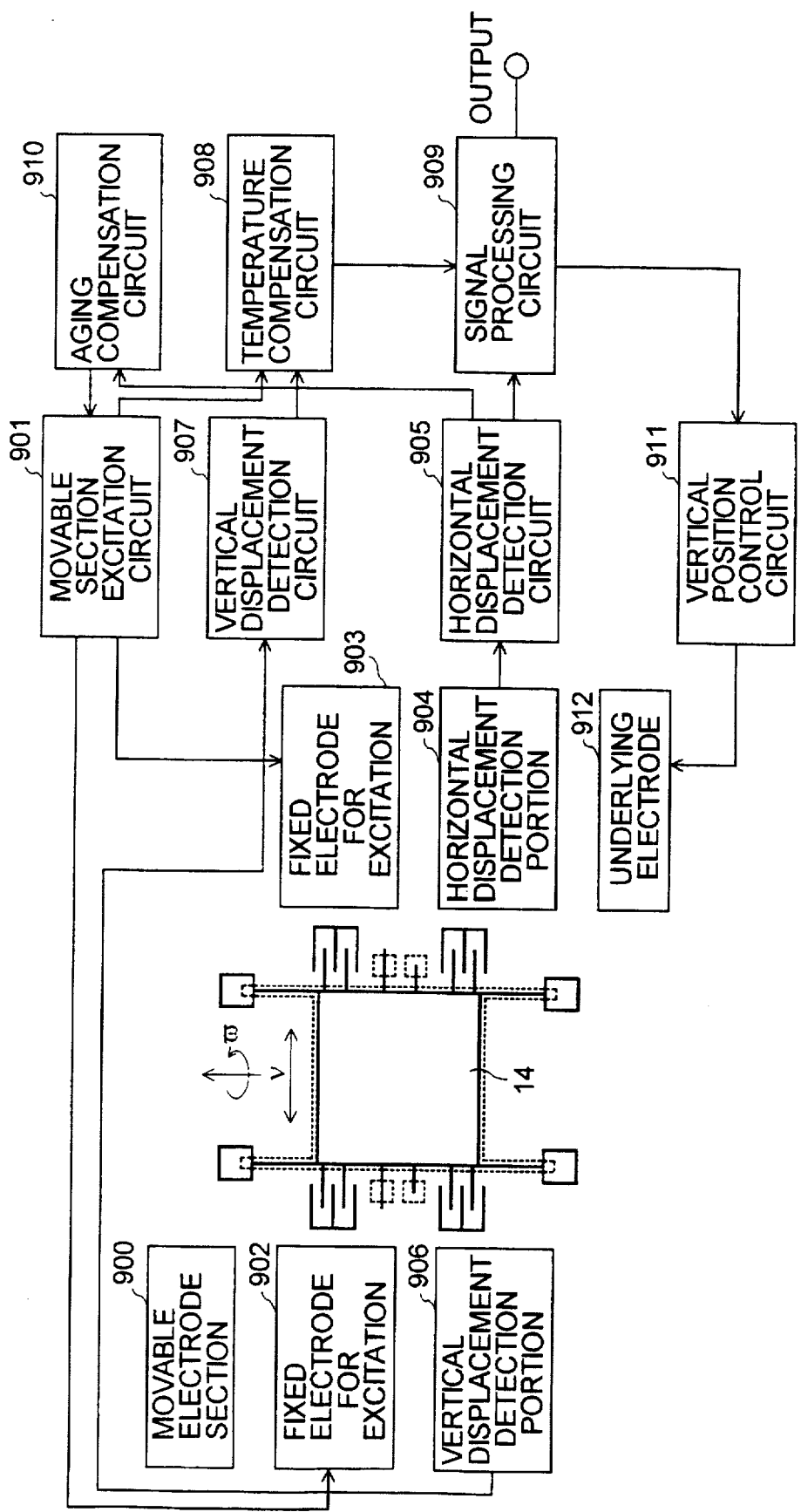
FIG. 4 is a diagram showing the function blocks of the semiconductor yaw rate sensor of the first embodiment.

FIG. 4 is a block diagram showing the yaw rate detection functions according to the yaw rate sensor of the embodiment.

First, the basic detection mechanism is explained with reference to FIG. 4. By supplying a cyclic voltage to fixed electrodes for excitation use 902 and 903 from a movable section excitation circuit (circuit for generating a horizontal vibration) 901, a movable electrode section 900 is vibrated in a horizontal direction approximately at a resonance frequency. The vibration condition is detected by means of a horizontal displacement detection portion 904, the detection output therefrom is input to a horizontal displacement detection circuit 905 for monitoring the horizontal displacement of the movable electrode section 900.

When angular velocity (yaw rate) ω shown in FIG. 4 acts on the vibrated movable electrode section 900, Coriolis force is generated and acts on the weight 14 perpendicularly with respect to substrate 11, and the weight 14 displaces cyclically in that direction. The resultant vertical displacement is detected by a vertical displacement detection portion 906, and the detection output therefrom is input to a vertical displacement detection circuit 907 for detecting the vertical displacement of the movable electrode section 900, i.e., weight 14. The output from both the horizontal and vertical displacement detection circuits 905 and 907, together with information about the distance between an underlying electrode 912 and the movable electrode section 900, is input to a signal processing circuit 909; and by means of a prescribed calculation being carried out, the applied angular velocity (yaw rate) ω is calculated to be output.

Moreover, as shown in FIG. 4, an aging compensation circuit 910, a temperature compensation circuit 908 and movable section control circuit (circuit for controlling the vertical position of the movable electrode section 900) 911 are included in the present embodiment. Therefore, the yaw rate detection with high accuracy is performed as follows:

By means of a cyclic voltage supplied to the fixed electrodes for excitation use 902 and 903 from the movable section excitation circuit 901, the movable electrode 900 is vibrated in the horizontal direction substantially at a resonance frequency as described above. The vibration condition is detected by means of the horizontal displacement detection portion 904, the detection output therefrom is input to the horizontal displacement detection circuit 905 to be monitored as described above.

When the yaw rate ω is applied to the movable electrode section 900, Coriolis force acting on the weight 14 displaces the weight 14 cyclically in perpendicular with respect to the substrate 11. The vertical displacement is detected by the vertical displacement detection portion 906, and the detection output is input to the vertical displacement detection circuit 907 as described above.

The output of the vertical displacement detection circuit 907 is input to the signal processing circuit 909 via the temperature compensation circuit 908. This is because an air gap transistor utilized in the vertical displacement detection portion 906 has temperature characteristics. More specifically, because, in the air gap transistor of the vertical displacement detection portion 906, the current Id flowing between source and drain thereof is given as the yaw rate value, it is necessary to take up that absolute value. Herein, as the transistor inherently has temperature characteristics, correction regarding a temperature drift is necessary on the detected current Id. After a correction is made by the temperature compensation circuit 908 with respect to the temperature characteristics of the vertical displacement detection portion 906, the output of the vertical displacement detection circuit 907 is input to the signal processing circuit 909.

Furthermore, the output of the horizontal displacement detection circuit 905 is input to the aging compensation circuit 910. Here, a loop comprising the horizontal displacement detection circuit 905, the aging compensation circuit 910, the movable section excitation circuit 901, the fixed electrodes for excitation use 902 and 903, the movable electrode section 900, the horizontal displacement detection portion 904 and the horizontal displacement detection circuit 905 in this order monitors the amplitude of the horizontal displacement of the movable electrode section 900; in case there are changes in resonance frequency due to residual stress etc., the correction amount in the excitation frequency of the cyclic voltage is determined by means of the aging compensation circuit 910 such that the movable section excitation circuit 901 generates the cyclic voltage having the excitation frequency so regulated as to vibrate the movable electrode section 900 at the resonance frequency which obtains the maximum amplitude.

In case the cyclic voltage is not intended to be regulated in frequency thereof, the amplitude resulted from the excitation frequency changes in accordance with the change in the resonance frequency and makes the vibration speed change, and therefore the generated Coriolis force changes due to the vibration speed. However, this can be corrected by a calculation in the signal processing circuit 909 using the correction amount determined by the aging compensation circuit 910.

The output of both the horizontal and vertical displacement detection circuits 905 and 907, the influences due to the deterioration with age and temperature characteristics being compensated, is input to the signal processing circuit 909 as described above; and by means of a prescribed calculation being carried out, the applied angular velocity (yaw rate) ω is calculated with high accuracy.

Moreover, the sensor of the embodiment can carry out closed-loop control. In this case, the output of the signal processing circuit 909 is supplied to the movable section control circuit 911 for controlling the vertical position of the movable electrode section 900, and the movable section control circuit 911 applies the voltage between the underlying electrode 912 and the movable electrode section 900 so as to keep the distance between the underlying electrode 912 and the movable electrode section 900 a constant value. By calculating the control voltage applied between the underlying electrode 912 and the movable electrode section 900 in the signal processing circuit 909, the closed-loop control of the sensor can be performed and a highly accurate yaw rate can be obtained from the calculated control voltage.

That is to say, in the case of the above-mentioned closed-loop control; when vibration speed v=0, because the current Id always takes up an initial condition (a condition which indicates no displacement), the control voltage is determined and applied between the movable electrode section 900 and the underlying electrode 912 so that the vertical displacement detection circuit 907 detects the current Id when v=0, and moreover the determined control voltage is utilized as the detected yaw rate.

Second Embodiment

Figure 5:
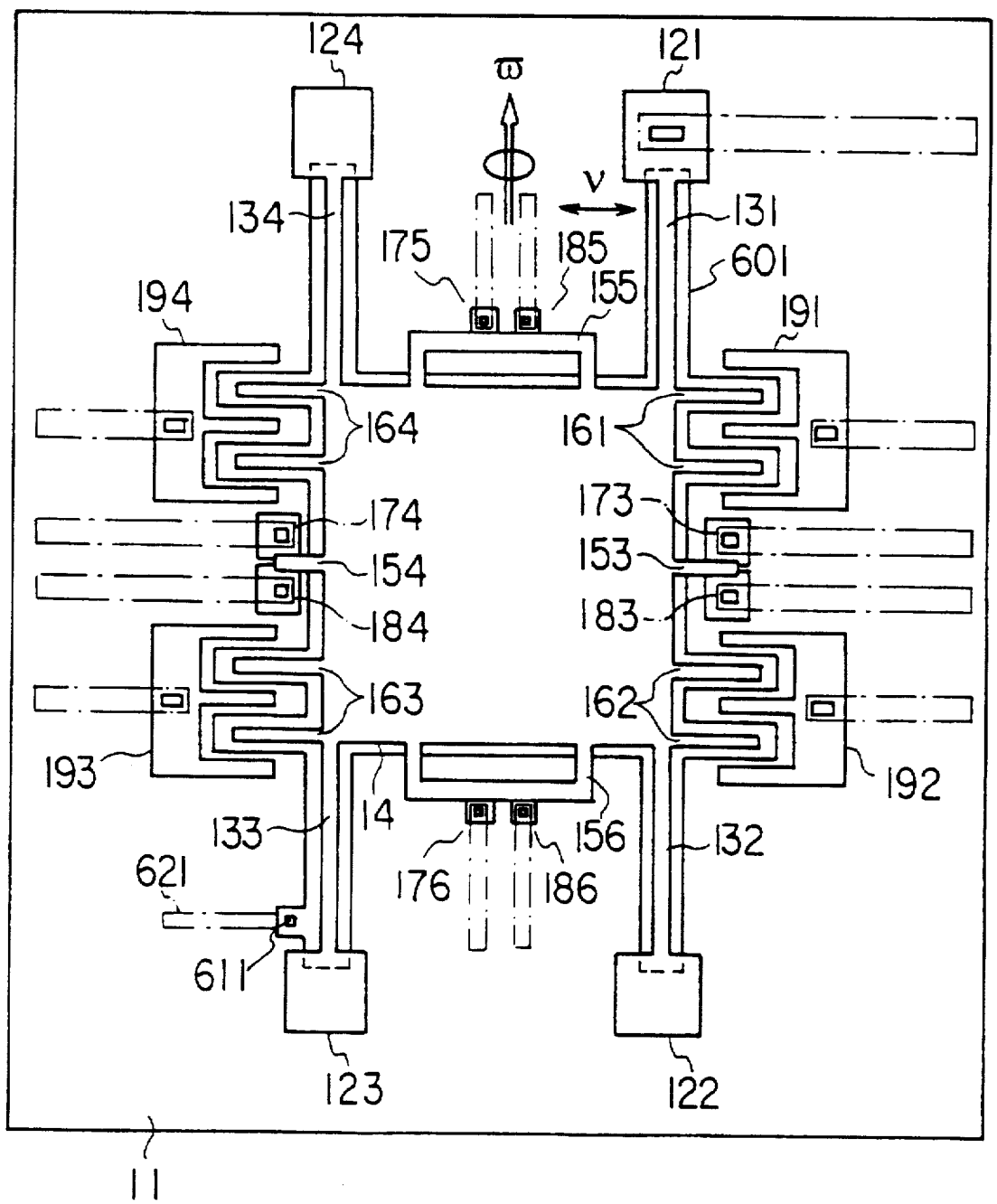
FIG. 5 is a schematic plan view showing a semiconductor yaw rate sensor according to a second embodiment of the present invention.

FIG. 5 shows a second embodiment of this invention. In the parts identical to the first embodiment shown in FIG. 1, identical reference numerals are applied; it is explained centering on those parts which are different. In this embodiment, detection of horizontal displacement of a movable section is achieved in the same way as in the first embodiment; by means of the provision of a transistor-type horizontal displacement detector comprising movable gate electrodes for horizontal displacement detection 153 and 154, source electrodes 173 and 174, and drain electrodes 183 and 184. On the other hand, as the vertical displacement detection portion, C-shaped movable gate electrodes for vertical displacement detection 155 and 156 are provided on the side portions, which are side portions in which the movable gate electrodes for horizontal detection 153 and 154 are not disposed, of the movable section so as to protrude therefrom in a direction perpendicular to a horizontal vibration direction v. Then, source/drain electrodes 175/185 and 176/186, corresponding to the movable gate electrodes for vertical displacement detection 155 and 156 respectively, are formed on the semiconductor substrate 11, and thereby a transistor-type vertical displacement detection means is constructed. Even if the weight 14 is excited in a horizontal direction, the respective amounts of overlap between the movable gate electrodes for vertical displacement detection 155 and 156 and the corresponding source/drain electrodes 175/185 and 176/186 do not change. However, when the weight 14 receives Coriolis force to be displaced in a vertical direction, the air gaps between the movable gate electrodes for vertical displacement detection 155 and 156 and the corresponding source/drain electrodes 175/185 and 176/186 change and the drain currents change. By means of this, an identical effect to the first embodiment is obtained.

Third Embodiment

Figure 6:
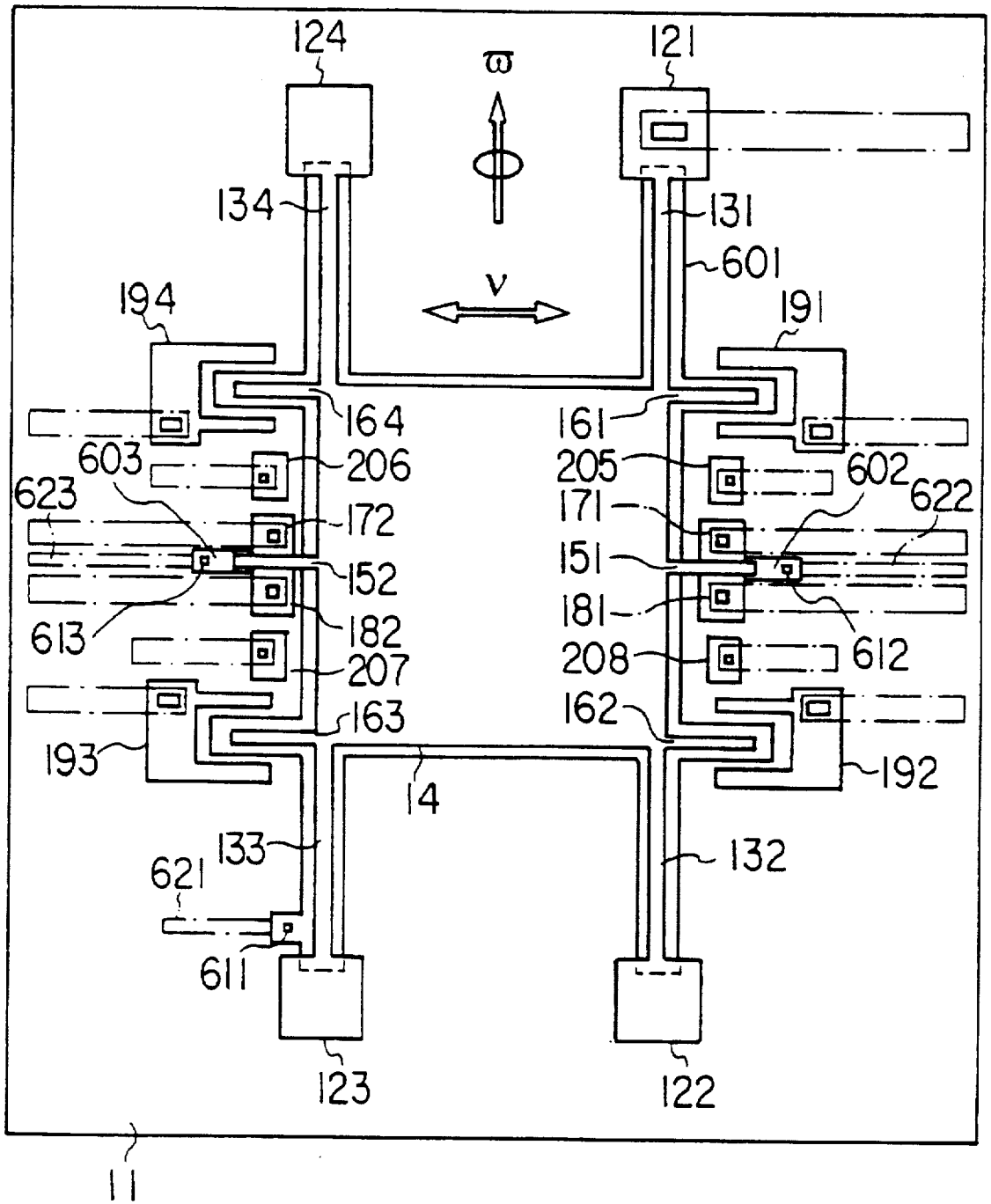
FIG. 6 is a schematic plan view showing a semiconductor yaw rate sensor according to a third embodiment of the present invention.

FIG. 6 shows a third embodiment of this invention. In the parts identical to the first embodiment shown in FIG. 1, identical reference numerals are applied; it is explained centering on those parts which are different. In this embodiment, detection of vertical displacement of a movable section is achieved in the same way as in the first embodiment; by means of the provision of a transistor-type vertical displacement detector comprising movable gate electrodes for vertical displacement detection 151 and 152, source electrodes 171 and 172, and drain electrodes 181 and 182. On the other hand, detection of horizontal displacement is achieved by means of the provision of a capacitor-type horizontal displacement detector. That is to say, in the direction of vibration of the weight 14 and adjacent to the side portions thereof, counter electrodes 205, 206, 207 and 208 are provided to be fixed on the semiconductor substrate 11, and thereby four capacitors, the capacitance of which are variable in accordance with changes in the distances between the weight 14 and the counter electrodes 205, 206, 207 and 208 due to the horizontal vibration, are formed. According to the present embodiment, an identical effect to the first embodiment can be obtained.

Fourth Embodiment

Figure 7:
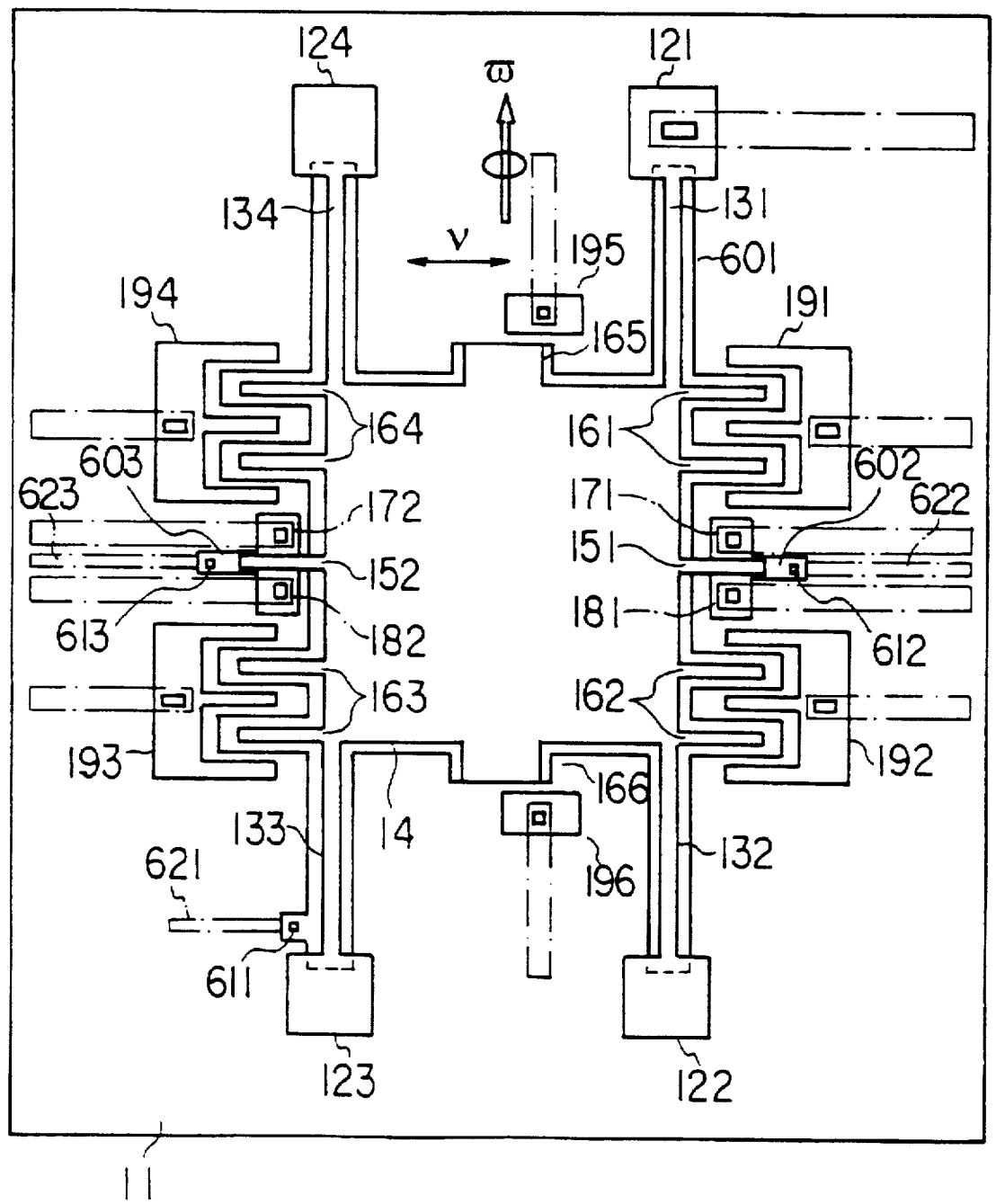
FIG. 7 is a schematic plan view showing a semiconductor yaw rate sensor according to a fourth embodiment of the present invention.

FIG. 7 shows a fourth embodiment of this invention. In the parts identical to the first embodiment shown in FIG. 1, identical reference numerals are applied; it is explained centering on those parts which are different. In this embodiment, detection of vertical displacement of a movable section is achieved in the same way as in the first embodiment; by means of the provision of a transistor-type vertical displacement detector comprising movable gate electrodes for vertical displacement detection 151 and 152, source electrodes 171 and 172, and drain electrodes 181 and 182. On the other hand, a horizontal displacement detection means is composed of two tab-shaped protrusions 165 and 166 protruding from the weight 14 in a direction perpendicular to the horizontal vibration direction of the weight 14; and corresponding counter electrodes 195 and 196 opposing the respective protrusions 165 and 166. The counter electrodes 195 and 196 are fixed on the semiconductor substrate 11 so as not to be aligned with the protrusions 165 and 166. Therefore, the capacitance between the protrusions 165 and 166 and the counter electrodes 195 and 196, respectively, are made variable in accordance with the horizontal vibration of the weight 14. That is to say, as the horizontal displacement detection means, variable capacitors, the capacitance of which change according to changes in opposing areas between the protrusions 165 and 166 and the counter electrodes 195 and 196, respectively, are provided in the present embodiment. According to the present embodiment, an identical effect to the first embodiment can be obtained.

In the way mentioned above, according to the preferred embodiments of the present invention, it is possible to provide a yaw rate sensor which can be structured easily and at low cost, and which can also detect exerted yaw rate with high accuracy. The yaw rate sensor according to the present invention is suited to, for example, be mounted in an automobile or the like and be used for body control or in navigation.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor yaw rate sensor comprising:

a semiconductor substrate;

a bridge structure movable section movably supported on said semiconductor substrate such that a specified interval is interposed between said movable section and said semiconductor substrate;

a fixed electrode for excitation use disposed on said semiconductor substrate in order to forcibly vibrate said movable section in a horizontal direction utilizing electrostatic force;

a vertical displacement detection means for detecting a vertical displacement of said movable section;

a horizontal displacement detection means for detecting a horizontal displacement of said movable section;

a signal processing means obtaining a yaw rate detection output utilizing at least a detection output of said vertical displacement detection means; and a correction means for keeping, based on an output of said horizontal displacement detection means, said movable section forcibly vibrated in said horizontal direction at a resonance frequency.

2. A semiconductor yaw rate sensor according to claim 1, wherein said signal processing means obtains said yaw rate detection output utilizing both detection output of said vertical and horizontal displacement detection means.

3. A semiconductor yaw rate sensor according to claim 1, further comprising a vertical position control means for controlling a distance between said semiconductor substrate and said movable section.

4. A semiconductor yaw rate sensor according to claim 2, further comprising a vertical position control means for controlling a distance between said semiconductor substrate and said movable section.

5. A semiconductor yaw rate sensor according to claim 3, wherein said vertical position control means includes an underlying electrode disposed on said semiconductor substrate beneath said movable section and a voltage adjusting means for controlling an applied voltage applied between said movable section and said underlying electrode based on said detection output of said vertical displacement detection means.

6. A semiconductor yaw rate sensor according to claim 1, wherein said vertical displacement detection means includes an air gap transistor structure comprising a movable gate electrode disposed on a side of said movable section, a source electrode disposed on a side of said semiconductor substrate and a drain electrode disposed on said side of said semiconductor substrate.

7. A semiconductor yaw rate sensor according to claim 2, wherein said vertical displacement detection means includes an air gap transistor structure comprising a movable gate electrode disposed on a side of said movable section, a source electrode disposed on a side of said semiconductor substrate and a drain electrode disposed on said side of said semiconductor substrate.

8. A semiconductor yaw rate sensor according to claim 3, wherein said vertical displacement detection means includes an air gap transistor structure comprising a movable gate electrode disposed on a side of said movable section, a source electrode disposed on a side of said semiconductor substrate and a drain electrode disposed on said side of said semiconductor substrate.

9. A semiconductor yaw rate sensor according to claim 5, wherein said vertical displacement detection means includes an air gap transistor structure comprising a movable gate electrode disposed on a side of said movable section, a source electrode disposed on a side of said semiconductor substrate and a drain electrode disposed on said side of said semiconductor substrate.

10. A semiconductor yaw rate sensor according to claim 1, wherein said horizontal displacement detection means includes an air gap transistor structure comprising a movable gate electrode disposed on a side of said movable section, a source electrode disposed on a side of said semiconductor substrate and a drain electrode disposed on said side of said semiconductor substrate.

11. A semiconductor yaw rate sensor according to claim 2, wherein said horizontal displacement detection means includes an air gap transistor structure comprising a movable gate electrode disposed on a side of said movable section, a source electrode disposed on a side of said semiconductor substrate and a drain electrode disposed on said side of said semiconductor substrate.

12. A semiconductor yaw rate sensor according to claim 3, wherein said horizontal displacement detection means includes an air gap transistor structure comprising a movable gate electrode disposed on a side of said movable section, a source electrode disposed on a side of said semiconductor substrate and a drain electrode disposed on said side of said semiconductor substrate.

13. A semiconductor yaw rate sensor according to claim 6, wherein said horizontal displacement detection means includes an air gap transistor structure comprising a movable gate electrode disposed on a side of said movable section, a source electrode disposed on a side of said semiconductor substrate and a drain electrode disposed on said side of said semiconductor substrate.

14. A semiconductor yaw rate sensor according to claim 1, wherein said horizontal displacement detection means includes a capacitor structure comprising a movable electrode disposed on a side of said movable section and a fixed counter electrode disposed on a side of said semiconductor substrate.

15. A semiconductor yaw rate sensor according to claim 2, wherein said horizontal displacement detection means includes a capacitor structure comprising a movable electrode disposed on a side of said movable section and a fixed counter electrode disposed on a side of said semiconductor substrate.

16. A semiconductor yaw rate sensor according to claim 3, wherein said horizontal displacement detection means includes a capacitor structure comprising a movable electrode disposed on a side of said movable section and a fixed counter electrode disposed on a side of said semiconductor substrate.

17. A semiconductor yaw rate sensor according to claim 6, wherein said horizontal displacement detection means includes a capacitor structure comprising a movable electrode disposed on a side of said movable section and a fixed counter electrode disposed on a side of said semiconductor substrate.

* * * * *